Aug. 30, 1938.                W. PECHY                2,128,265
                         PRESSURE GAUGE DEVICE
                          Filed Aug. 17, 1935
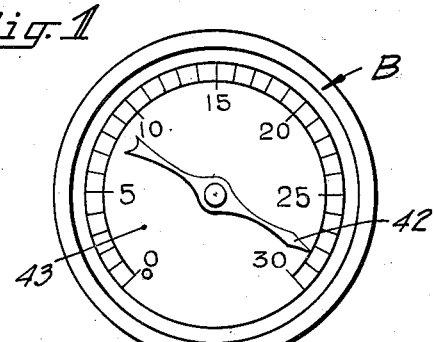
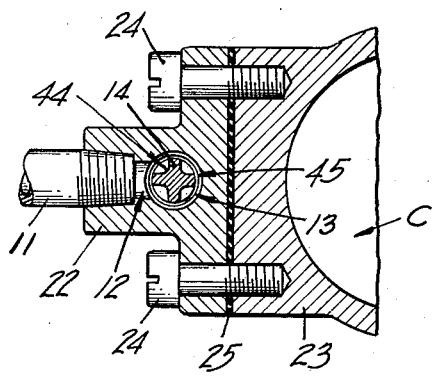
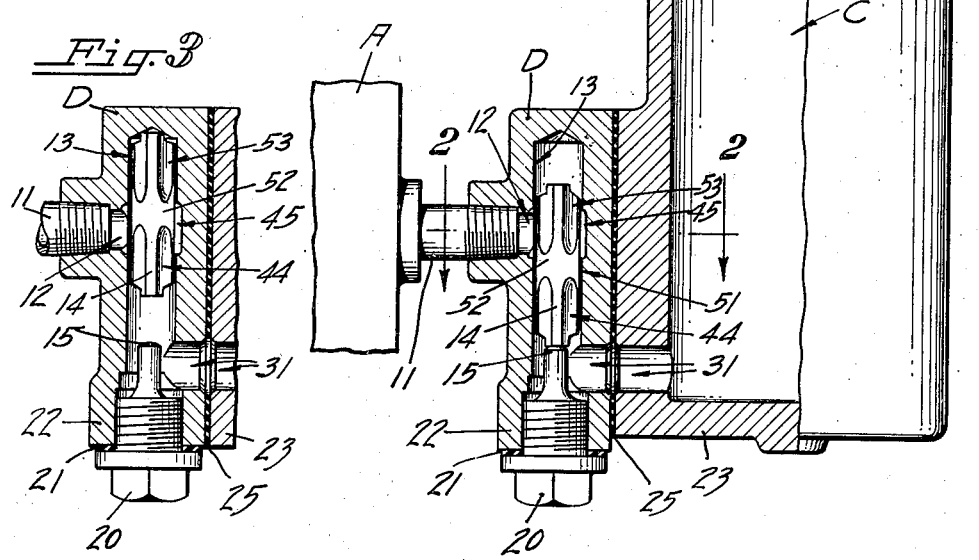
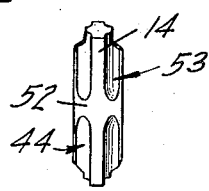
INVENTOR
William Pechy
BY Ivan D. Thornburg
Charles H. Ernst
ATTORNEYS Patented Aug. 30, 1938

2,128,265

UNITED STATES PATENT OFFICE 2,128,265

PRESSURE GAUGE DEVICE

William Pechy, Elizabeth, N. J., assignor to American Can Company, New York, N. Y., a corporation of New Jersey Application August 17, 1935, Serial No. 36,737

5 Claims. (Cl. 73—31)

The present invention relates to the measurement of pressure in a treating chamber or the like, and is particularly adapted to measurements of pressure in a chamber subject to great and sudden fluctuations such, for example, as in some forms of vacuum sealing machines or pressure sealing machines for cans or other vessels wherein the chamber pressure is broken between successive cans and is built up or reduced for each sealing operation, this condition throwing an excessive and violent strain on the pressure measuring instrument or gauge resulting in undue wear, lack of sensitivity and difficulty in reading.

An object of the present invention is the provision of a damping device for such a pressure measuring instrument which may be embodied in the pressure or vacuum line and which functions to so control the pressure influence effective on the instrument gauge as to protect it at all times and under any condition of absolute pressures and under any rate of change of such conditions.

Numerous other objects and advantages of the invention will be apparent as it is better understood from the following description, which, taken in connection with the accompanying drawing, discloses a preferred embodiment thereof.

Referring to the drawing:

Figure 1 is a part elevation, part sectional view of a pressure measuring instrument embodying the present invention and as applied to a vacuum line showing the elements in positions assumed when the final degree of vacuum is being drawn;

Fig. 2 is a broken horizontal cross-section taken substantially at 2—2 in Fig. 1;

Fig. 3 is a fragmentary part of the section of Fig. 1 showing the elements in different position such as would be assumed when a vacuum is beginning to be drawn; and Fig. 4 is a perspective view of a valve shuttle part of the instrument.

To illustrate one set of conditions in the functioning of the instant invention, the drawing discloses a preferred adaptation of it to the air line of a treating chamber which may be a part of a semi-automatic, or hand-operated vacuum closing machine. The treating chamber of the machine is indicated by the letter A, and the vacuum gauge unit for registering the degree of vacuum in chamber A includes a vacuum gauge indicated by the letter B. A gauge chamber C, cooperates with a check valve D, to control or dampen the effects upon the gauge B of sudden vacuum or pressure fluctuations in chamber C.

In a semi-automatic or hand-operated vacuum closing machine, the absolute pressure in the treating chamber may fluctuate between about zero and fifteen pounds. This is approximately equivalent to 30 and 0 inches of mercury as indicated on the vacuum gauge. The full range of such a fluctuation may occur during treating or closing of each successive can or successive batches of cans in the chamber A.

The chamber A communicates with the check valve D through a connecting nipple 11 and such a nipple in the present embodiment supports the whole gauge unit. A port 12 provides for communication between the nipple and a vertical check valve cylinder bore 13 in which a fluted shuttle 14 is located. The shuttle normally rests upon the upper end 15 of a shoulder screw 20 which, together with a gasket 21, seals the lower end of the bore 13.

The body of check valve D, designated by the numeral 22, is bolted to a surrounding casing 23 of the chamber C as by screws 24. An interposed gasket 25 may be used to seal this connection.

A lower port 31 is formed in the members 22 and 23, and passes through the gasket 25. This port establishes communication between the valve bore 13 and the interior 32 of the gauge chamber C. This chamber is sealed by a cap 33 screwed into its upper end, a gasket 34 making the seal hermetic. The gauge B is screwed into this cap, and a port 35 establishes communication between the chamber interior 32 and a hollow stem 41 which communicates with the interior of the gauge.

Before treating operations are started, atmospheric pressure will obtain in chamber A, in the cylinder bore 13, chamber 32 and in the interior of the gauge. At such a time the shuttle 14 rests on the screw 20 (as shown in Fig. 1) and an indicator or hand 42 of the gauge stands at the zero point of the gauge dial which is marked by the reference numeral 43.

When the vacuumizing operation begins a relatively great quantity of air is suddenly evacuated from the chamber A. The air in the gauge chamber C being then at a relatively higher pressure than in chamber A, tends to suddenly escape through the restricted port 31, bore 13, port 12 and nipple 11. This sudden rush of air lifts the shuttle 14 from its position of rest on the screw end 15 into raised position as shown in Fig. 3 or perhaps into some intermediate position depending upon the pressure differences on the two ends of the shuttle. The body diameter of the shuttle is not much smaller than the diameter of the bore 13 and accordingly only a restricted quantity of air can pass at a given time between the shuttle and the wall of the bore.

The shuttle 14 is formed with lower flutes 44, cut in its body and in the raised position shown in Fig. 3, these lower flutes align with a relieved or enlarged channel 45 of the bore 13 this channel being located adjacent the port 12. This shuttle position provides an increased opening for the passage of air from the gauge to the treating chamber as will be further explained.

As vacuumizing continues on the treating chamber there is less and less air to be withdrawn from the gauge chamber. Consequently the pressure difference is reduced between the two ends of the shuttle and it eventually drops back into the normal position of Fig. 1. The air communication between the gauge and the treating chamber A is now around the larger body diameter of the shuttle 14 and the wall of the bore 13 as has already been referred to. This clearance is best shown in Fig. 1 as at 51 and the solid or larger shuttle waist diameter is indicated at 52. It will be observed that this section 52 lies intermediate the lower flutes 44 and other upper flutes 53.

Flutes 44 and 53 are alike in form, which design maintains a symmetry about the center of gravity of the shuttle 14 which makes for a well balanced shuttle and a consequent smoothness of sliding action in the bore. It also makes possible the insertion of shuttle 14 in the bore 13 with either flutes 44 or 53 lowermost without affecting its proper functioning.

When chamber A is restored to atmosphere the pressure differences on the two ends of the shuttle are suddenly reversed and air tends to suddenly flow from the treating chamber into the gauge chamber. The flow of air is now restricted by the limited passage through the clearance 51 adjacent the shuttle waist 52. In considering the size of the gauge actuating passages the capacity of the gauge chamber 32 is comparatively large so that it requires a considerable quantity of air relative to the amount which can pass through the restricted passage 51 in a given time before the gauge hand 42 moves appreciably over the dial 43.

This damping of the return swing of the gauge hand is the result desired and protects the gauge mechanism as it insures an appreciable time for any gauge change. Where the time intervals between vacuumizing operations are short, the damping effect will be sufficiently prolonged so that the gauge hand will move but little and the shuttle may not even be raised from the position shown in Fig. 1 when a new vacuumizing operation is again started as there remains sufficient air pressure in the gauge chamber to hold the gauge hand against excessive movement.

While the treating chamber A has been considered as a vacuum chamber and the gauge unit B adapted for vacuum measurement, it will be understood that the same identical principle can be utilized where chamber A is under pressure in excess of atmosphere. In such a case the vacuum gauge B would necessarily be replaced by a pressure gauge and in order to obtain proper functioning of the check valve D, the relative position of the ports 12, 31 would be altered. In other words, the chamber port 12 would enter the cylinder bore 13 below the shuttle as it rests on the screw 20 and the port 31 would pierce the wall of the cylinder bore above the waist section 52 of the shuttle when in such position.

The shuttle under such conditions functions to dampen and restrict the flow of air or other fluid toward the treating chamber between pressure treating operations.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fluid pressure measuring device for a chamber having fluid pressure fluctuation, the combination of a gauge for measuring fluid pressure in said chamber, and a check valve interposed between the chamber and said gauge for restricting the flow of fluid therebetween, said check valve comprising a member having a longitudinally extending bore and a shuttle member movably mounted therein, said first member having a transverse passage in communication with said bore intermediate its ends, said shuttle member having grooves over one end portion thereof to reduce its effective diameter at the grooved portion and movable to alternate positions in said bore, the non-grooved portion of said shuttle member retarding flow of fluid through the bore in one position of said member and the grooved portion of said member augmenting the flow of fluid through said bore when the member is in alternate position and the grooves in registration with said transverse passage.

2. In a device of the character described having a chamber provided with fluid pressure fluctuation, and a gauge for measuring fluid pressure in said chamber, and a gauge chamber disposed adjacent said gauge for storing a relatively large quantity of fluid under pressure whereby to cushion said gauge against shock: a check valve interposed between said first mentioned chamber and said gauge chamber for restricting the flow of fluid therebetween, said check valve comprising a member having a longitudinally extending bore and a shuttle member movably mounted therein, said first member having a transverse passage in communication with said bore intermediate its ends, said shuttle member having grooves over one end portion thereof to reduce its effective diameter at the grooved portion and movable to alternate positions in said bore, the non-grooved portion of said shuttle member retarding flow of fluid through the bore in one position of said member and the grooved portion of said member augmenting the flow of fluid through said bore when the member is in alternate position and the grooves in registration with said transverse passage.

3. In a fluid pressure measuring device for operation with a treating chamber, the combination of a gauge for indicating pressure conditions in said chamber, a member having a vertical bore interposed between said gauge and said chamber, said bore communicating at one end with said gauge, a horizontal passage communicating intermediate said bore and with said chamber, and a check valve reciprocable in said bore for preventing violent fluctuations of pressure on said gauge, said check valve being grooved at its opposite end portions and of normal diameter at its intermediate portion, the grooved portion at one end of said valve being arranged to register with said passage when the valve is in one position, the portion of normal diameter of said valve being designed to register with said passage when the valve is in an alternate position as automatically determined by pressure differences between said gauge and said chamber, the portion of normal diameter of said valve when in registry with said passage retarding flow of fluid through said bore and the grooved portion of said valve when in registry with said passage augmenting the flow of fluid through said bore, whereby said valve is balanced about its longitudinal center for a smooth actuation within said bore, the grooved portions at opposite ends of said valve permitting the latter to be reversed for normal automatic reciprocation within said bore.

4. In a fluid pressure measuring device for operation with a vacuum treating chamber, the combination of a vacuum gauge for indicating pressure conditions in said member, a member having a bore interposed between said gauge and said chamber, said bore communicating at one end with said gauge, a passage communicating with said bore and with said chamber, and a check valve reciprocable in said bore for damping fluctuations of pressure on said gauge, said check valve having a fluted portion and a non-fluted portion each arranged to register with said passage in alternate positions of said valve as determined by pressure differences between said gauge and said chamber for restricting and damping the flow of fluid toward said gauge, the non-fluted portion of said valve when in registry with said passage retarding flow of fluid through said bore, and the fluted portion of said valve when in registry with said passage augmenting the flow of fluid through said bore.

5. In a device of the character described, the combination of a chamber responsive to fluid pressure fluctuations, a gauge communicably connected to said chamber for measuring fluid pressure therein, and a check valve interposed between said chamber and said gauge for restricting the flow of fluid therebetween, said check valve comprising a member having a longitudinally extending bore and a shuttle member movable therein against gravity by the fluid flowing in one direction to establish an enlarged passage for an increased flow of fluid from said gauge to said chamber, said shuttle being moved by gravity to a normal position to check the fluid flow from said chamber to said gauge, a transverse passage in communication with said bore intermediate its ends, said shuttle member having spaced longitudinal grooves at an end portion thereof to reduce its effective diameter at such portions and movable with and against gravital forces to alternate positions in said bore, the non-grooved portion of said shuttle member retarding the flow of fluid through the bore in one position of said member and the grooved portion of said member augmenting the flow of fluid through said bore when the member is in alternate position with its grooved portion in registration with said transverse passage.

WILLIAM PECHY.